United States Patent [19]

Herbst et al.

[11] 4,244,975
[45] Jan. 13, 1981

[54] AQUEOUS, PROTEINACEOUS, CLEANING CONCENTRATE FOR THE CLEANSING OF FOODSTUFF

[75] Inventors: Sigurd Herbst, Cologne-Ostheim; Rolf Bietz, Monheim, both of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 87,679

[22] Filed: Oct. 24, 1979

Related U.S. Application Data

[63] Continuation-in-part of Ser. No. 948,221, Oct. 3, 1978, Pat. No. 4,177,294.

[30] Foreign Application Priority Data

Dec. 23, 1978 [DE] Fed. Rep. of Germany ....... 2856086

[51] Int. Cl.$^3$ ............................................... A23C 9/14
[52] U.S. Cl. ................................... 426/271; 134/42; 252/105; 252/106; 426/250; 426/268; 426/286; 426/335; 426/532; 426/654
[58] Field of Search ............. 426/250, 286, 268, 271, 426/321, 335, 532, 654; 252/105, 106; 134/42

[56] References Cited

U.S. PATENT DOCUMENTS

| | | | |
|---|---|---|---|
| 2,108,563 | 2/1938 | Mnookin et al. | 426/286 |
| 3,336,141 | 8/1963 | Frisina | 426/271 X |
| 3,526,511 | 9/1970 | Rockland | 426/271 X |
| 3,814,820 | 6/1974 | Busta et al. | 426/268 X |
| 3,943,063 | 3/1976 | Morishita et al. | 426/302 X |
| 4,133,901 | 1/1979 | Fetzer et al. | 426/302 X |
| 4,140,649 | 2/1979 | Bossert et al. | 426/271 X |
| 4,177,294 | 12/1979 | Herbst et al. | 426/271 |

*Primary Examiner*—Robert L. Lindsay, Jr.
*Attorney, Agent, or Firm*—Hammond & Littell, Weissenberger and Muserlian

[57] ABSTRACT

An aqueous, proteinaceous concentrate for the cleansing of foodstuffs of animal or vegetable origin, consisting of:
(a) from 0.1% to 20% by weight of water-soluble to water-dispersible proteins,
(b) from 0 to 15% by weight of a water-soluble sequestering agent,
(c) an effective amount of a preservative selected from the group consisting of (1) from 0.01% to 1% by weight of water-soluble food preservatives and (2) from 5% to 30% of ethanol,
(d) from 0 to 0.5% by weight of food colors and food odorants, and
(e) the remainder to 100%, water.

10 Claims, No Drawings

AQUEOUS, PROTEINACEOUS, CLEANING CONCENTRATE FOR THE CLEANSING OF FOODSTUFF

REFERENCE TO PRIOR APPLICATION

This application is a continuation-in-part of Ser. No. 948,221, filed Oct. 3, 1978, now U.S. Pat. No. 4,177,294, granted Dec. 4, 1979.

BACKGROUND OF THE INVENTION

In many instances it is desirable to wash feedstuffs of both animal and vegetable origin to rid the same of dirt, blood, insects and insect detritus, microorganisms, such as mold, mildew and pathogenic bacteria, etc. Water alone is not always efficient and ordinary additives to water, such as surface-active compounds, may give rise to a change in the taste appeal of the washed foodstuff.

The parent application Ser. No. 948,221 describes an aqueous concentrate for the cleansing of foodstuffs of animal or vegetable origin, consisting of:
 (a) from 0.1% to 10% by weight of water-soluble to water-dispersible proteins,
 (b) from 0.01% to 3% by weight of water-soluble polymers having a molecular weight of at least 10,000,
 (c) from 1% to 15% by weight of a water-soluble sequestering agent,
 (d) from 0.01% to 1% by weight of water-soluble food preservatives,
 (e) from 0 to 0.5% by weight of food colors and food odorants, and
 (f) the remainder to 100%, water. This concentrate, however, requires the presence of relatively large amounts of components which are not of natural origin.

OBJECTS OF THE INVENTION

An object of the present invention is the development of an aqueous concentrate for the cleansing of foodstuffs of animal or vegetable origin which adequately removes foreign matter therefrom without affecting the taste and aroma of the washed foodstuff which itself is largely of natural origin.

Another object of the present invention is the development of an aqueous, proteinaceous concentrate for the cleansing of foodstuffs of animal or vegetable origin, consisting of:
 (a) from 0.1% to 20% by weight of water-soluble to water-dispersible proteins,
 (b) from 0 to 15% by weight of a water-soluble sequestering agent,
 (c) an effective amount of a preservative selected from the group consisting of (1) from 0.01% to 1% by weight of water-soluble food preservatives and (2) from 5% to 30% of ethanol,
 (d) from 0 to 0.5% by weight of food colors and food odorants, and
 (e) the remainder to 100%, water.

These and other objects of the invention will become more apparent as the description thereof proceeds.

DESCRIPTION OF THE INVENTION

The present invention relates to an aqueous, proteinaceous concentrate for the cleansing of foodstuffs of animal or vegetable origin, consisting of:
 (a) from 0.1% to 20% by weight of water-soluble to water-dispersible proteins,
 (b) from 0 to 15% by weight of a water-soluble sequestering agent,
 (c) an effective amount of a preservative selected from the group consisting of (1) from 0.01% to 1% by weight of water-soluble food preservatives and (2) from 5% to 30% of ethanol,
 (d) from 0 to 0.5% by weight of food colors and food odorants, and
 (e) the remainder to 100%, water.

It has now been found that not only combinations of protein compounds and water-soluble synthetic organic polymers can be used for the cleaning of food and feed, as described in the parent application, but that a good cleaning effect comparable to that of the cleaning solutions according to the parent application is obtained with the use of single protein compounds as well as of combinations of different protein compounds as effective agents.

The advantage of the cleaning agents of the present invention is the fact that they consist practically completely of substances of natural origin, which has special significance with respect to their area of application. Beyond this, aqueous, preferably aqueous-alcoholic concentrates with a much higher content of active substance, protein compounds in this instance, can be prepared, which leads to products that are characterized by a reversible gel formation, even after storing at 4° C. for days and rewarming to room temperature. The products consequently can be prepared in an advantageously concentrated form and diluted to the ratio 1:500, preferably 1:100 to 1:250, for application.

Sequestering agents are not absolutely necessary to achieve the cleaning effect. However, they can have a favorable effect on the storage life of the protein solutions and are, therefore, included as a rule. Also suitable can be the addition of preservatives, coloring agents and fragrances.

The preparations of the invention are characterized by the complete absence of surfactants or surface-active compounds and are physiologically harmless. They are low sudsing and do not cause skin irritations when used by hand.

The preparations are used as diluted aqueous solutions and are particularly suitable for cleansing vegetable products, such as fruits, vegetables, salad greens, potatoes, root vegetables, beets, mushrooms, etc. In addition, they can also be used for cleansing animal products, such as meat, fish, eggs, cheese wheels, etc. The cleansing can be effected by hand by washing, brushing, etc., or mechanically in the home, in restaurants, institutional kitchens, food- and feed-processing plants, etc. The dirt usually adhering to foodstuffs, such as earth, residues of fertilizer or pesticides, animal pests, and contamination caused by them are reliably removed. By rinsing with water, the cleaning preparations can be easily washed out.

Water-soluble to water-dispersible proteins that are suitable in the sense of the invention are obtained from animal or vegetable products, such as albumin from cattle plasma, egg albumin, sodium caseinate, gelatin, extracts from protein-containing seeds, etc. Because of the better clear solubility in water in the presence of salts, native proteins are particularly suitable, which requires, however, special precautions in their production and processing.

Particularly suitable among the proteins and protein hydrolysates obtained from vegetable products are primarily vegetable globulins, e.g., legumin and vicilin from peas, glycinin from soybeans, or phaseolin from beans. They are obtained in known manner, e.g., by extraction of protein-containing plants or their seeds or bulbs with salt solutions or solutions of weak alkalies, such as common salt solution, sodium sulfate, sodium bromide, sodium ethylenediaminetetraacetate, sodium nitrilotriacetate, calcium hydroxide, mixtures of monosodium and disodium phosphate, etc. The extraction of crushed peas or defatted soybeans can be effected, for example, with about a 10% common salt solution and the protein separated therefrom. Fatty plant parts, particularly seeds, are defatted before the extraction, preferably by treatment with organic solvents. All production methods are preferably carried out at temperatures which are below the denaturation temperatures of the respective protein, that is, preferably below 70° C.

Animal proteins are likewise obtained according to known methods and are partly commercially available. They are already partly denatured at temperatures about 40° C.

The cleaning concentrate has a content of 0.1% to 20%, preferably 0.2% to 10% by weight, of the water-soluble to water-dispersible proteins as a single protein or as mixtures of proteins.

The sequestrants or water-soluble sequestering agents optionally employed are, for example, the hydroxylcarboxylates normally used in washing agents, such as the alkali metal citrates, lactates, tartrates, the aminocarboxylates, such as the alkali metal salts of ethylenediaminetetraacetic acid, nitrilotriacetic acid, as well as inorganic sequestering salts, such as the alkali metal phosphates and polyphosphates, preferably as sodium salts. If one of the above mentioned salts was used in the extraction of vegetable proteins, the separation of salt solution from the extracted protein and the separate addition of sequestrants is not necessary.

The optional content of sequestrants in the cleaning concentrate is from 0% to 15%, preferably 3% to 12%, by weight.

Finally, the cleaning mixtures contain preservatives, such as alkali metal and alkaline earth metal salts of sorbic acid, benzoic acid, formic acid, boric acid, or other preservatives which are particularly suitable for foods, in amounts of 0.01% to 1.0%, preferably 0.05% to 1%, by weight, if necessary together with coloring and odorizer substances utilized for foodstuffs.

The above content of preservatives may be replaced by a content of 5% to 30%, preferably 10% to 20% by weight of ethanol, which can be regarded as solvent and naturally preserving adjuvant at the same time. Mixtures of both ethanol and water-soluble food preservatives can also be employed.

The cleaning liquors are normally adjusted to a pH value of 6 to 8, but they can be used in a wide pH range of 5 to 10.

The following specific examples are illustrative of the invention without being limitative in any respect.

EXAMPLES

Preparation of Vegetable Proteins 500 gm of deoiled soybean grit were stirred for 30 minutes with 1,000 gm of a 0.03 molar calcium hydroxide solution. The soybean grit residue was separated in a sieve centrifuge. The extract was pressure filtered with 10% diatomite and, subsequently, the soybean protein was precipitated by adjusting the extract to a pH of 4.5 with dilute hydrochloric acid. The precipitated soybean protein was obtained by filtering or decanting and was dried under gentle conditions. The dry extract is colloidally soluble in salt solutions.

3 kg of yellow, dried peas were crushed and suspended for 30 minutes in 6 kg of a 20% solution of sodium ethylenediaminetetraacetate (EDTA). The suspension was filtered under pressure. The extract was heated for 15 minutes with stirring to 70° C., and again filtered. Yield: 3 kg pea extract in the form of a clear solution which contains EDTA as a sequestrant.

EXAMPLE 1

3.0 kg of gelatin hydrolyzate (molecular weight about 10,000)
7.0 kg of sodium citrate
0.1 kg of a preservative (Kathon 886 ®, a mixture of 5-chlor-2-methyl-4-isothiazolin-3-one magnesium chloride and 2-methyl-4-isothiazolin-3-one magnesium chloride sold by Rohm and Haas Co.)
were dissolved in 90 kg of water.

This clear, low-viscosity concentrate was used as cleaning agent, after diluting with water at a ratio of 1:100.

EXAMPLE 2

4.0 kg of gelatin hydrolyzate (MW about 10,000)
4.0 kg of gelatin
10.0 kg of sodium citrate
20.0 kg of ethanol
were made up with water to 100 kg, and the pH of the mixture was adjusted to about 6.

The clear concentrate is used as cleaning agent, after diluting with water at a ratio of 1:250.

EXAMPLE 3

2.0 kg of gelatin
1.0 kg of sodium caseinate
2.5 kg of sodium citrate
0.1 kg of Kathon 886 ®
were made up to 100 kg with water.

The slightly turbid, low-viscosity concentrate was used as cleaning agent, after diluting with water at a ratio of 1:100.

EXAMPLE 4

1.5 kg of sodium caseinate
1.5 kg of soybean protein
5.0 kg of sodium citrate
were made up to 100 kg with water.

The slightly turbid concentrate was used as cleaning agent, after diluting with water at a ratio of 1:100.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An aqueous, proteinaceous concentrate for the cleansing of foodstuffs of animal or vegetable origin, consisting of:
   (a) from 0.1% to 20% by weight of water-soluble to water-dispersible proteins,
   (b) from 0 to 15% by weight of a water-soluble sequestering agent, (c) an effective amount of a preservative selected from the group consisting of (1) from 0.01% to 1% by weight of water-soluble food preservatives and (2) from 5% to 30% of ethanol, (d) from 0 to 0.5% by weight of food colors and food odorants, and (e) the remainder to 100%, water.

2. The aqueous concentrate of claim 1 wherein said protein is present in an amount of from 0.5% to 10% by weight.

3. The aqueous concentrate of claims 1 or 2 wherein said proteins are native proteins.

4. The aqueous concentrate of claim 3 wherein said native proteins are from protein-containing seeds.

5. The aqueous concentrate of claim 4 wherein said native proteins from protein-containing seeds have been obtained by extraction of protein-containing seeds with aqueous solutions containing water-soluble compounds selected from the group consisting of inorganic salts, organic salts and weak alkalies.

6. The aqueous concentrate of claims 1 or 2 wherein said protein includes gelatin.

7. The aqueous concentrate of claims 1 or 2 wherein said protein includes gelatin hydrolyzate.

8. The aqueous concentrate of claims 1 or 2 wherein said protein is a mixture of gelatin and gelatin hydrolyzate.

9. The aqueous concentrate of claims 1 or 2 wherein said water-soluble sequestering agent component (b) is present in an amount of from 3% to 12% by weight and is an alkali metal salt of an acid selected from the group consisting of citric acid, lactic acid, tartaric acid, aminocarboxylic acids, phosphoric acid and polyphosphoric acids.

10. The aqueous concentrate of claim 1 wherein component (a) is present in an amount of from 0.5% to 10% by weight, component (b) is present in an amount of from 3% to 12% by weight, and component (c) is ethanol present in an amount of from 10% to 20% by weight.

* * * * *